US007812855B2

(12) United States Patent
Babich et al.

(10) Patent No.: US 7,812,855 B2
(45) Date of Patent: Oct. 12, 2010

(54) GLASSBREAK NOISE DETECTOR AND VIDEO POSITIONING LOCATOR

(75) Inventors: Thomas S. Babich, Glen Cove, NY (US); Kevin G. Piel, Ronkonkoma, NY (US)

(73) Assignee: Honeywell International Inc., Morristown, NJ (US)

( * ) Notice: Subject to any disclaimer, the term of this patent is extended or adjusted under 35 U.S.C. 154(b) by 1181 days.

(21) Appl. No.: 11/061,421

(22) Filed: Feb. 18, 2005

(65) Prior Publication Data

US 2006/0197666 A1 Sep. 7, 2006

(51) Int. Cl.

| | |
|---|---|
| ***H04N 9/47*** | (2006.01) |
| ***H04N 7/18*** | (2006.01) |
| ***H04N 7/14*** | (2006.01) |
| ***B60R 25/10*** | (2006.01) |
| ***G08B 29/00*** | (2006.01) |
| ***G08B 13/00*** | (2006.01) |
| ***G08B 1/00*** | (2006.01) |

(52) U.S. Cl. .................... 348/143; 348/14.08; 348/159; 340/531; 340/550; 340/511; 340/426.23; 340/566

(58) Field of Classification Search ......... 348/143–160, 348/550, 169–172; 379/37–51; 340/511, 340/541–693.12, 426.27

See application file for complete search history.

(56) References Cited

U.S. PATENT DOCUMENTS 4,668,941 A * 5/1987 Davenport et al. .......... 340/550
4,918,717 A * 4/1990 Bissonnette et al. ........... 379/40
5,014,039 A * 5/1991 Zelenka ...................... 340/565
5,109,216 A * 4/1992 Yarbrough et al. .......... 340/544
5,315,285 A * 5/1994 Nykerk .................. 340/426.23
5,341,122 A * 8/1994 Rickman .................... 340/515
5,471,195 A * 11/1995 Rickman .................... 340/550
5,543,778 A * 8/1996 Stouffer ................. 340/539.14
5,764,131 A * 6/1998 Twining et al. .......... 340/311.2
6,100,792 A * 8/2000 Ogino et al. ........... 340/426.25
6,107,918 A * 8/2000 Klein et al. ................. 340/511
6,175,307 B1 * 1/2001 Peterson ..................... 340/531
6,351,214 B2 * 2/2002 Eskildsen et al. ........... 340/550
6,388,573 B1 * 5/2002 Smith et al. ................. 340/556
6,417,769 B1 * 7/2002 Jan ............................ 340/541
6,493,687 B1 * 12/2002 Wu et al. ...................... 706/15
6,538,570 B1 * 3/2003 Smith ......................... 340/550
6,658,091 B1 * 12/2003 Naidoo et al. ................. 379/37
6,707,619 B1 * 3/2004 Okuno ........................ 359/694
6,894,714 B2 * 5/2005 Gutta et al. .............. 348/14.07
6,975,220 B1 * 12/2005 Foodman et al. ............ 340/531
7,023,913 B1 * 4/2006 Monroe ................. 375/240.01

(Continued)

*Primary Examiner*—Jason Chan
*Assistant Examiner*—Pritham Prabhakher
(74) *Attorney, Agent, or Firm*—Husch Blackwell Welsh & Katz

(57) ABSTRACT

A glass break detector is provided with microphones for detecting glass breaking, and microphones for detecting noise, and generating a noise output once a noise is detected. The noise output triggers a video camera to record in the area of the glass break detector. Also, a security apparatus is provided, having a video dome, a video camera provided in the video dome, and one or more microphones provided on an outside surface of the video dome. If a noise is detected by the one or more microphones, the video camera points to a direction of the noise by determining the time of arrival of the noise, and the camera begins to record.

30 Claims, 3 Drawing Sheets

U.S. PATENT DOCUMENTS

| | | | | |
|---|---|---|---|---|
| 7,129,838 | B2 * | 10/2006 | Shimomura et al. | 340/541 |
| 7,130,383 | B2 * | 10/2006 | Naidoo et al. | 379/37 |
| 7,346,186 | B2 * | 3/2008 | Sharoni et al. | 382/103 |
| 7,421,727 | B2 * | 9/2008 | Oya et al. | 725/105 |
| 2001/0033227 | A1 * | 10/2001 | Eskildsen et al. | 340/544 |
| 2003/0160862 | A1 * | 8/2003 | Charlier et al. | 348/14.08 |
| 2003/0229474 | A1 * | 12/2003 | Suzuki et al. | 702/188 |
| 2004/0008264 | A1 * | 1/2004 | Nister | 348/207.99 |
| 2004/0036596 | A1 * | 2/2004 | Heffner et al. | 340/531 |
| 2004/0086088 | A1 * | 5/2004 | Naidoo et al. | 379/37 |
| 2004/0105004 | A1 * | 6/2004 | Rui et al. | 348/159 |
| 2004/0247086 | A1 * | 12/2004 | Menard et al. | 379/45 |

* cited by examiner

GLASSBREAK NOISE DETECTOR AND VIDEO POSITIONING LOCATOR

BACKGROUND OF THE INVENTION

1. Field of the Invention

The present invention relates to video systems for monitoring and security purposes in home and commercial buildings, and more specifically, to glass break detectors and video dome cameras for surveillance purposes.

2. Prior Art

Video systems that monitor surveillance areas generally use sensors, such as motion detectors, to prioritize what cameras in the system are displayed on a display and recorded. Thus, if a motion sensor in a certain area is triggered, then that camera is displayed on a display and recorded.

Glass break detectors are only designed to detect the breaking of glass. Although acoustic glass break detectors detect the breaking of glass through microphones, the setting or threshold of the level of the noise is usually high, as the breaking of glass results in a loud noise. Thus, if any noise below this setting or threshold is made, whether the glass breaks or not, a control center or alarm panel is not alerted because the glass break detectors only detect when the glass is broken, which requires a loud noise.

However, in certain surveillance areas, noise detection may be needed or required. The glass break detectors in the prior art do not have a noise detection mode that may be required in video or other applications that need noise detection.

Further, in the prior art, the video systems used for monitoring surveillance areas either use motion detectors or glass break detectors for prioritizing which cameras are to be displayed and/or recorded. If motion is detected or glass breaking is detected in a certain surveillance area, the video from the video cameras located in that surveillance area of the glass break detectors or motion detectors is viewed to determine the cause.

Video cameras in these video monitoring systems are usually placed in sphere-shaped video camera domes, and these video cameras are capable of 360-degree rotation, so that all possible angles can be viewed once the glass break or motion has been detected. Video cameras that are placed in video domes have a limited field of view; however, they have a large area of interest. Thus, even though the camera is able to turn 360 degrees and record or monitor at any possible angle, the odds are that the camera will be looking in another direction or location instead of the area of interest at that time. By the time the cameras are rotated all the way around to see each possible angle and determine the cause of the motion or glass breaking, a thief might have left the surveillance area, thus escaping before being seen or recorded on camera.

Thus, there remains a distinct need for improvement of the security video monitoring systems described above.

SUMMARY OF THE INVENTION

Therefore, it is an object of the present invention to provide a surveillance detection device for home and commercial buildings that allows for a glassbreak detector that is also capable of detecting noise, and cameras that are able to monitor and/or record an area of interest based on where the noise is coming from.

To achieve the foregoing and other objects and in accordance with the purpose of the present invention, as embodied and broadly described herein, a glass break detector is provided, comprising glass break detecting means for detecting glass breaking, and noise detecting means for detecting noise and generating a noise output once a noise is detected, wherein the noise output triggers a video camera to record in the area of the glass break detector. The glass break detecting means and noise detecting means can comprise one or more microphones.

The glass break detector further comprises a terminal block, wherein the terminal block has a glass break output and the noise output. The glass break detector further comprises a setting to set a predetermined threshold for glass break detection, and a setting to set a predetermined threshold of a level of noise, wherein if the noise detected is above the threshold level, the noise output is generated. A signal is sent to a control center to alert the control center that a noise has been detected.

The glass break detector further comprises a DIP switch for setting a mode of the glass break detector. The mode can be set to only detect glass breaking, or the mode can be set to detect glass breaking and noise.

Further, a security apparatus is provided, comprising a video dome, a video camera provided in the video dome, and one or more microphones provided on an outside surface of the video dome, wherein if a noise is detected by the one or more microphones, the video camera points to a direction of the noise. The number of microphones can be three. The video camera is capable of up to 180 degree rotation, or 360 degree rotation.

The security apparatus further comprises a time of arrival processing circuit that determines the direction of the noise by the time of arrival of the noise at the one or more microphones. The security apparatus further comprises a circuit board that directs the video camera to the source of the noise detected by the one or more microphones. The video camera starts recording once directed to the source of the noise.

The video camera can be continuously directed to the source of the noise and can continuously track a source of the noise. The video camera continuously tracks the source of the noise by the one or more microphones continuously monitoring a time of arrival of the noise from the noise source.

Also provided is a method of tracking a noise source, comprising detecting a noise by providing one or more microphones on an outside surface of a video dome, providing a video camera inside the video dome, determining a direction that the noise is coming from, and directing the camera to a direction of the noise. The direction that the noise is coming from is determined by the time of arrival of the noise at the one or more microphones.

The method of tracking a noise source further comprises recording video on the video camera once the noise is detected and the camera is directed to the direction of the noise. The method further comprises continuously tracking a source of the noise, where the one or more microphones continuously tracks the source of the noise by continuously monitoring a time of arrival of the noise. The method further comprises continuously directing the video camera to the direction of the noise and continuously recording in that direction.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Although this invention may be applicable to various intrusion detection devices, it has been found particularly useful in the environment of surveillance equipment for commercial and residential structures. Therefore, without limiting the applicability of the invention to the above, the invention will be described in such environment.

In the present invention, a video system is used comprised of various video cameras set up in a surveillance area and a central display recording area where video from all of the cameras are shown on a screen and/or recorded. Video from different video cameras can be shown on the screen in a control center, and a user in the control center can pick and choose which camera they want to see video from on the screen. More than one screen is usually present in the control center.

Motion detectors and glass break detectors are set up in various surveillance areas with the video cameras. The video from the video cameras to be shown on the screen(s) can be picked by a user by choosing one or more specific video camera(s), or the video shown on the screen(s) can be based on which area a glass break, noise or motion has been detected. The camera(s) in that area is then automatically shown on the screen(s), and the control center is automatically alerted that a glass break, noise or motion has been detected in that area, and the camera(s) in that area are automatically set to record.

Figure 1:
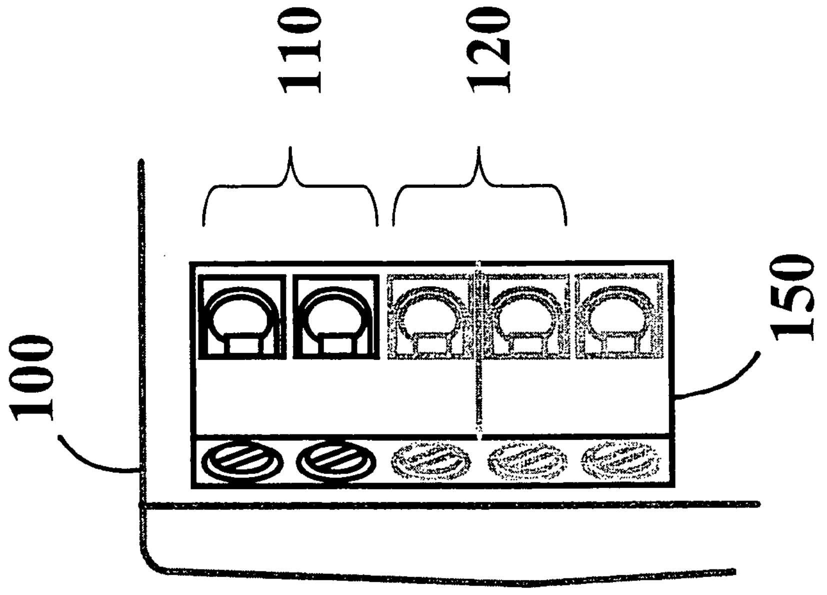
FIG. 1 shows a glassbreak detector having two separate outputs for a glass break output and a noise output.

With reference now to the drawings, the components of the present invention will be described. In FIG. 1, a glass break detector 100 is provided with a terminal block 150. The glass break detector 100 is able to detect glass breaking through a glass break detecting means, and is also able to detect noise through noise detecting means, such as microphones. A glass break output 110 and a noise output 120 are provided on the terminal block 150. If the glass break detector 110 detects a glass break, a signal is sent through the glass break output 110 to the control center, alerting the control center that glass has broken in the area of the glass break detector 100.

Further, if the microphones in the glass break detector 100 detect any noise, then a signal is sent through noise output 120. The signal sent from the noise output 120 triggers the video cameras located in the area of the glass break detector 100 that has detected the noise. The video cameras in that area are automatically set to record. The signal can also be sent to the control center, to alert the control center that a noise has been detected in the area of the glass break detector 100.

Figure 2:
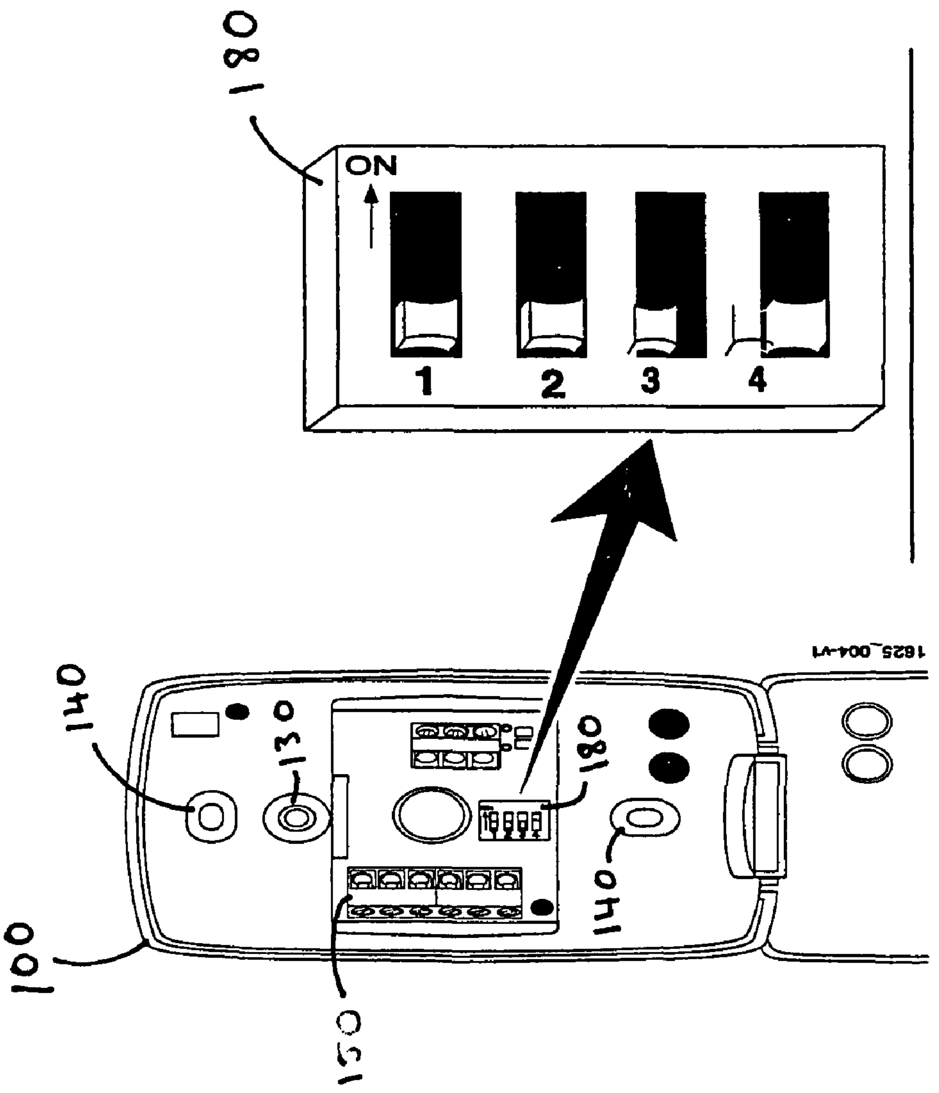
FIG. 2 shows the glass break detector of FIG. 1 with an option for a dip switch.

As seen in FIG. 2, the glass break detector 100 can be installed on a wall or any structure through screw holes 140. Any other means may be utilized to install the glass break detector 100 as known in the art. A microphone 130 detects noise for purposes of the noise output 120, and also for the glass output 110 if an acoustic glass break detector is used. More than one microphone can be used.

A Dual In-Line Package (DIP) switch 180 is provided in the glass break detector 100, with settings 1-4, as seen in FIG. 2. Settings 1-4 can be used to set various aspects of the present invention. Setting 1 can be used to set the threshold level for glass break detection, so that only noise above that threshold would cause a glass break detection by the glass break detector 100, thereby outputting a signal through the glass break output 110. Setting 2 can be used to set the threshold level for noise detection, so that only noise above that threshold would cause a noise detection by the glass break detector 100, thereby outputting a signal through the noise output 120 and triggering the video cameras to begin recording in the area of the glass break detector 100. Setting 3 can be used for any other setting that may be needed on the glass break detector 100.

Setting 4 can be used to set the mode of the glass break detector 100. In one position, setting 4 would cause the glass break detector 100 to perform only glass break detection. In the other position, setting 4 would perform glass break detection and noise detection. In the other position, setting 4 could also be set to perform only noise detection, but preferably, it performs glass break detection and noise detection.

The dip switch 180 provides a selectable option on the glass break detector to detect noise and/or glass breaking. The dip switch 180 also allows the glass break detector to detect noise above a certain threshold and trigger an output. Thus, even if glass is not broken, the glass detector can detect noise above a certain threshold. This threshold can be predetermined, and can be input either directly onto the glass break detector 100 through setting 2 or by a remote means, such as through the control center. This allows the glass break detector 100 to detect noise in the area of the glass break detector 100 that is above a certain threshold, by sending a signal through noise output 120.

The signal sent from the noise output 120 can be used for various applications, including turning on local video cameras in that area, and to set the video cameras in that area to record. Further, this output can be used to turn screens on in the control center showing the video from the video cameras associated with that area where the noise is detected, and an alert can also be provided to the control center that a noise has been detected in that area.

Figure 3:
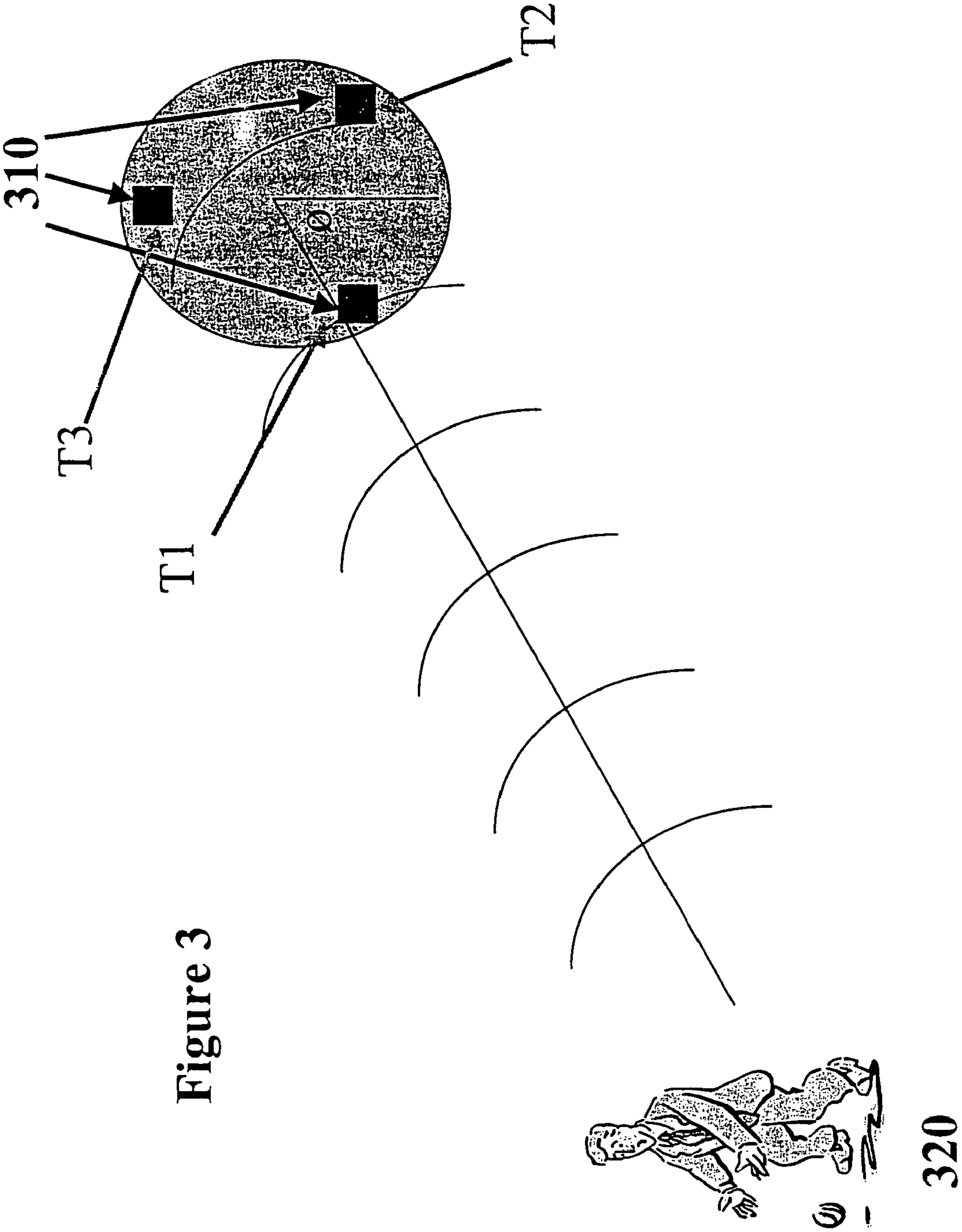
FIG. 3 shows a video dome camera with a series of microphones for pinpointing a source of noise.

FIG. 3 shows a video dome 300 with a video camera located inside of it that is capable of up to 180-degree or up to 360-degree rotation within the dome; thus, full rotation is possible.

A series of microphones 310 can be mounted around the outside surface of the video dome 300 that can pinpoint sources of noise (as provided in the disclosure of U.S. Pat. No. 5,471,195, the entire disclosure of which is incorporated herein). Preferably, three microphones 310 are used on the video dome 300 as shown in FIG. 3. The microphones 310, along with a time-of-arrival processing circuit (not shown), form a direction-sensing system for the video camera located inside the video dome 300.

A noise source 320 provides a source of noise. By comparing the arrival times T1, T2, and T3 of the noise at three spaced microphones 310, the time-of-arrival processing circuit determines the direction of the noise. If the sound originated in the intended coverage zone, the processing circuit generates a signal.

Preferably, two or more microphones are used on the video dome 300, but any number is possible. These microphones 310, as described above, are able to pinpoint the source of noise and once the microphones 310 detect a noise, and the processing circuit generates a signal, the signal is sent to a circuit board.

The circuit board, through appropriate software, directs the video camera to point at an angle θ where the noise came from, judged from the signal sent from the microphones 310 when a noise has been detected. Thus, the video camera aims at the angle θ from which the noise came, and the video from that specific video camera can be automatically displayed on a screen in a control center once the noise is detected. The video camera can also begin recording concurrently in the direction from which the noise came.

By measuring time T1, T2 and T3, and by estimating the angle θ that the noise source 320 came from, the video camera is directed to look in that direction. Further, as the noise source 320 moves, the time T1, T2 and T3 are still measured, and the angle θ changes. The video camera is rotated accordingly and moves to follow the noise source 320. Therefore, the noise source 320 can be tracked and followed by the video camera located inside the video dome 300.

Now, operation of the present invention in the illustrative embodiment will be described with references to the figures and components described above.

Each glass break detector 100 has a means for detecting the breaking of glass and detecting noise. A setting 4 on the dip switch 180 is set to detect both noise and glass breaking. A separate setting 2 provides for a minimum noise threshold. Once a noise is detected over the noise threshold, a signal is sent through the noise output 120. The signal sent from the noise output 120 triggers the video cameras located in the area of the glass break detector 100 that has detected the noise. The video cameras in that area are automatically set to record.

The signal can also be sent to the control center, to alert the control center that a noise has been detected in the area of the glass break detector 100. The video from one or more video camera(s) located in the area of the glass break detector 100 can automatically be shown on a screen in the control center. The dip switch 180 can be set to detecting glass breaking only, noise detecting only, or both. This allows a person in the control center to monitor a surveillance area if any noise is detected, regardless of whether the glass is broken or not.

Further, the noise can be tracked by providing a video dome camera 300. One or more video dome(s) 300 with a video camera located inside of it are set up in one or more areas of surveillance, and the video from the video cameras can be monitored on screens in a control center. The number of screens in the control center can be equal to the number of video cameras, or can be less.

One or more microphones 310 are placed on the outside surface of the video dome camera. The microphones are attached by an attachment means known in the art, such as glue, Velcro, and the like. Preferably, three microphones 310 are spaced equally apart and located on the outside surface of each video dome camera 300 in the area of surveillance.

Once a noise source 320 outputs a noise, the microphones 310 sense the noise. The microphones 310 have a setting so that only noise above a certain level is detected by the microphones 310, allowing the user to set the minimum noise required to alert and trigger the video camera. The microphones 310 are programmed to pinpoint sources of noise by the time of arrival (T1, T2, T3) of the noise. By using the time of arrival of any noise that is sensed, the video camera estimates the direction the noise came from.

Once the microphones sense the noise and determine the direction of the noise, the video camera is then turned in that direction, and the video camera is automatically set to record. A control center is alerted that a noise has been detected in the specified area. Further, a screen in the control center can automatically show the video from the video camera on a screen.

Also, if the noise source 320 is moving, then the microphones can continuously track the noise source by continuously detecting the noise. Thus, the microphones can continuously determine the direction of the noise, and the video camera is continuously moved along in the direction of the noise. As the video camera in the video dome 300 is capable of 180 degree or 360 degree rotation, the video camera continuously tracks the noise source 320, and continuously records the noise source 320.

The video system described above can be used in a multitude of applications, ranging from home security to banks, parking garages and any other commercial application where video security systems are used.

The present invention provides several advantages that solves the problems with prior art methods. In the prior art, the glass break detectors would respond only to glass breaking, and not any type of noise. Also, the video dome cameras would have a limited field of view, and generally not record in the area or direction of interest.

The present invention solves these problems by providing a video system in which the glass break detectors are able to detect noise, and video cameras begin recording when a noise over a certain threshold is detected. In the prior art, if a thief is making noise or is able to obtain entry into the secured area without breaking the glass, there would be no warning or alarm to let security be aware of the fact that the thief has obtained entry into the secured area. By detecting noise, the present invention provides for noise detection so that if any noise is made and the glass is not broken, a control center is alerted and the video cameras begin to record the security area.

Further, if the thief were attempting to break the glass, then prior art glass break detectors would not sense this until the glass is broken. Usually, some noise is made or multiple attempts are made to break glass before the glass is broken. The present invention, by providing for noise detection on the glass break detector, would sense any attempt at breaking the glass by providing for noise detection on the glass break detector. Thus, security can be warned before the glass is broken that somebody is attempting to break the glass, and the person attempting entry can be stopped before he/she breaks the glass. Also, once a noise is detected, the video cameras are triggered and begin to record. Thus, the person attempting entry is recorded on the video camera, whether they are able to obtain entry or not. Thus, significant advantages are provided by the present invention over the prior art.

The use of microphones on a video dome, as provided in FIG. 3, also offers significant advantages over the prior art. In the prior art, video cameras in video domes would generally not be directed in the area of interest. Further, a person obtaining entry into a secured area would generally not stay in that area, but move around the area. Therefore, the video camera, even if it were in the direction of the person, would lose the person once he/she started to move around the secured area.

By providing microphones that detect and can pinpoint the source of the noise, the video camera provided for in the present invention can point in the direction of the noise and begin recording. Thus, the noise source can be located. Further, in large areas where a person obtains entry into a secured area and moves around, the video camera in the video dome can continuously track the person and follow the person by moving the camera continuously in the direction of the noise. Thus, a person can be followed and continuously recorded who has obtained entry into a secured area.

There are several other uses of the invention not limited by the description and embodiment as described above. The invention may also be applicable to other electronic surveillance and alarm security systems for commercial and residential buildings. Any type of motion detectors and glass detectors known in the art may be used in combination with the video system of the present invention. Any number of microphones that can pinpoint the direction of noise may be used on each video dome camera.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A glass break detector, comprising: a wall mounted housing; a terminal block carried by the housing; a first output of the terminal block for a glass break detecting means that detects glass breaking only for noise above a glass breakage threshold; and a second output of the terminal block for a noise detecting means that detects noise at least in an audible frequency range and generates an audible noise output once a noise is detected in the audible range without breaking glass; said glass break detector having a plurality of modes settable by a user from within the housing including a first mode wherein only the second output triggers a video camera to record in the area of the glass break detector and a second mode wherein only the first output triggers the video camera to record in the area of the glass break detector.

2. The glass break detector of claim 1, wherein the glass break detecting means comprises one or more microphones.

3. The glass break detector of claim 1, wherein the noise detecting means comprises one or more microphones.

4. The glass break detector of claim 1, further comprising a terminal block, wherein said terminal block has a glass break output and the noise output.

5. The glass break detector of claim 1, further comprising a setting to set a predetermined threshold for glass break detection.

6. The glass break detector of claim 1, further comprising a setting to set a predetermined threshold of a level of noise, wherein if the noise detected is above the threshold level, the noise output is generated.

7. The glass break detector of claim 1, wherein a signal is sent to a control center to alert the control center that a noise has been detected.

8. The glass break detector of claim 1, further comprising a DIP switch for setting a video recording mode of the glass break detector, wherein the mode is selected from a group of modes including only detecting glass breaking, only detecting noise and detecting glass breaking and noise.

9. The glass break detector of claim 8, wherein the mode is set to only detect glass breaking.

10. The glass break detector of claim 8, wherein the mode is set to detect glass breaking and noise.

11. The glass break detector of claim 1, further comprising a transmitter for transmitting a signal to a central monitoring station said signal causing at least one monitoring screen to activate.

12. The glass break detector of claim 1, further comprising a first setting to set a first predetermined threshold for glass break detection; and a second setting to set a second predetermined threshold of a level of noise, wherein the first and second predetermined thresholds distinguish noise and glass break, and wherein if the noise detected is above the second threshold level, the noise output is generated.

13. The glass break detector of claim 12, wherein the first and second predetermined thresholds are set remotely.

14. A security apparatus comprising: a wall mounted housing; a video dome; a video camera provided in the video dome; a glass breakage detector within the wall mounted housing; a switch in the glass breakage detector having a plurality of switch positions settable by a user from within the housing and one or more microphones provided on an outside surface of the video dome; wherein the switch has a first position of the plurality of positions that causes the video camera to point in the direction of a noise only upon detection of an audible noise without breaking glass at least in an audible frequency range by the one or more microphones and a second position of the plurality of positions that causes the video camera to point in the direction of the noise upon detection of an audible noise with breaking glass.

15. The security apparatus of claim 14, wherein said number of microphones is three.

16. The security apparatus of claim 14, wherein the video camera is capable of up to 180 degree rotation.

17. The security apparatus of claim 14, wherein the video camera is capable of up to 360 degree rotation.

18. The security apparatus of claim 14, further comprising a time of arrival processing circuit that determines the direction of the noise by the time of arrival of the noise at the one or more microphones.

19. The security apparatus of claim 14, further comprising a circuit board that directs the video camera to the source of the noise detected by the one or more microphones.

20. The security apparatus of claim 14, wherein the video camera starts recording once directed to the source of the noise.

21. The security apparatus of claim 14, wherein the video camera is continuously directed to the source of the noise and continuously tracks a source of the noise.

22. The security apparatus of claim 21, wherein the video camera continuously tracks the source of the noise by the one or more microphones continuously monitoring a time of arrival of the noise from the noise' source.

23. A method of tracking a noise source, comprising: providing a glass breakage detector within a wall mounted housing; providing a video recording mode switch in the glass breakage detector having a plurality of video recording modes of settable by a user from within the housing, the plurality of video recording modes including a first mode in which records video only upon detecting an audible noise without glass breakage exceeding a first threshold value; and a second mode which records video only upon detecting an audible noise exceeding a second threshold associated with glass breakage; in the first mode detecting an audible noise exceeding the first threshold without breaking glass at least in an audible frequency range by providing one or more microphones on an outside surface of a video dome and in the second mode detecting an audible noise exceeding the second threshold with breaking glass; providing a video camera inside the video dome; determining a direction that the audible noise is coming from based upon the selected mode; and directing the camera to a direction of the audible noise.

24. The method of tracking a noise source of claim 23, wherein the direction that the noise is coming from is determined by the time of arrival of the noise at the one or more microphones.

25. The method of tracking a noise source of claim 23, further comprising recording video on the video camera once the noise is detected and the camera is directed to the direction of the noise.

26. The method of tracking a noise source of claim 23, wherein three microphones are provided on the outside surface of the video dome.

27. The method of tracking a noise source of claim 23, wherein a video camera capable of up to 360 degree rotation inside the video dome is provided.

28. The method of tracking a noise source of claim 23, further comprising continuously tracking a source of the noise.

29. The method of tracking a noise source of claim 28, wherein the one or more microphones continuously tracks the source of the noise by continuously monitoring a time of arrival of the noise.

30. The method of tracking a noise source of claim 29, further comprising continuously directing the video camera to the direction of the noise and continuously recording in that direction.

* * * * *